United States Patent [19]

Evans et al.

[11] Patent Number: 4,957,215
[45] Date of Patent: Sep. 18, 1990

[54] SEGMENTED NOZZLE DAM

[76] Inventors: Cliff Evans, 207 Chestnut Ridge, Bethel, Conn. 06801; Jagdish H. Shah, 4 Beechwood Ct., Woodbury, Conn. 06798

[21] Appl. No.: 310,316

[22] Filed: Feb. 13, 1989

[51] Int. Cl.⁵ .............................................. F16L 55/12
[52] U.S. Cl. ..................................... 220/232; 277/34; 138/89; 138/93; 376/204
[58] Field of Search .................... 220/232; 138/89, 93, 138/94; 277/34, 34.3, 199; 376/203, 204, 205

[56] References Cited

U.S. PATENT DOCUMENTS

| | | | |
|---|---|---|---|
| 4,482,076 | 11/1984 | Wentzell | 220/232 |
| 4,637,588 | 1/1987 | Wilhelm et al. | 277/34 X |
| 4,667,701 | 5/1987 | Evans et al. | 138/93 |
| 4,682,630 | 7/1987 | Schukel | 138/89 |
| 4,690,172 | 9/1987 | Everett | 138/89 |

*Primary Examiner*—Stephen Marcus
*Assistant Examiner*—Nova Stucker
*Attorney, Agent, or Firm*—Robert A. Seemann

[57] ABSTRACT

A disk of joined segments, having a water resistant sheet over the seams of joining, is mounted on a ring around the nozzle, and water tightly sealed against the ring by expandable rings. A circular portion of the disk that is concentric with the central axis of the nozzle is thinner than the central portion of the disk at the central axis of the nozzle, measured in solid cross section. The thinner circular portion is contoured for resistance to stress from pressure of fluid against the disk. The contour includes a concave annular outer surface of the disk, rising toward the center of the disk. At least one segment includes a beam oriented longitudinally with the segment, traversing and clearing the concave annular surface, and attached at each end to the segment. A plurality of bolt fasteners hold the disk to the segment. The bolt is threaded at the front end for screwing into the ring, and threaded at the back end for receiving a hold-down finger knob. The shaft of the bolt includes a spacer to help align the disk within the ring, and a wrench flat for removal of a broken bolt.

13 Claims, 3 Drawing Sheets

SEGMENTED NOZZLE DAM

BACKGROUND OF THE INVENTION

1. Field of the Invention

The present invention relates to closures and plugs, more specifically to a nozzle dam which is segmented and contoured for high strength-to-weight ratio, for portability and for rapid installation in a confined space. One application, for example, is sealing a nozzle from within a nuclear steam generating vessel.

During maintenance of a nuclear steam generation system, it is necessary for an operator to enter the steam generator vessel to seal a nozzle against reactor water which is under pressure to seek an equilibrium level by entering the vessel.

The operator must enter the vessel by way of a manway, an opening that is smaller in diameter than the opening of the nozzle to be sealed. Consequently the dam must be temporarily reduced in size by some means so that it can be passed through the manway.

The interior environment of the vessel is radioactive and so confined that usually only a single operator at a time can operate there to manipulate and fasten the dam in place, maximum allowable exposure for a single individual being limited to a few minutes.

2. Description of the Prior Art

A nozzle plug that is capable of being used to seal a nuclear steam generator nozzle is described in U.S. Pat. No. 4,482,076, patented Nov. 13, 1984 by Timothy H. Wentzell.

The plug consists of a sectioned base plate, each section being reinforced by upstanding, parallelly extending side wall members or ribs with lightening holes, fixedly attached to the planar base portion of the base plate.

The sections are joined together at the ribs to make the base plate. They are fastened together through adjacent ribs by a combination of pins in offset slots and quick-disconnect pin fasteners.

For added strength and rigidity, the ribs meet in a series of open boxes as seen from the top of the plate. Alternatively, cross pieces are fastened across the ribs and bolted between the ribs, to the assembled disk.

The plate is installed in the nozzle opening, generally below the frustoconical throat of the nozzle. It is held in place by quick-disconnect fasteners having pins extending radially through bosses in an annular peripheral flange on the plate, and into openings in the side wall surfaces of the nozzle below the frustoconical throat of the nozzle.

A pair of inflatable beads, formed as a double rim around the circumference of the plate, are sealingly joined with a resilient member that covers the surface of the plate that faces into the nozzle. The beads are filled with air from a pump to form a seal between the plate and the nozzle wall. Fluid pressure against the outer surface of the resilient member tends to urge one inflated rim against the other which is then urged into engagement with the circumferential rim portions of the plate.

In an alternative embodiment, two plates are fastened as described above, within the nozzle below the frustoconical opening. Each plate has only one inflatable bead rim, and in each, the base plate is a concave wall of generally uniform thickness, to which the ribs with lightening holes are attached.

To install the dam, the operator assembles the plate by interconnecting the sections at the ribs, then bolts on the cross pieces over the ribs, then cooperatively associates the resilient members with the assembled frame, and finally inserts the frame in place and secures it by quick disconnect fastener pins into the nozzle walls.

Another nozzle plug is described by James W. Everett in U.S. Pat. No. 4,690,172, patented Sept. 1, 1987. In this application, fluid pressure is directed against the dam from the frustoconical side of the nozzle. The dam consists of two flat plate assemblies, an inner seal plate which is located in the conical portion of the nozzle, and an outer seal plate which is located further down in the nozzle and is connected to the inner seal plate by a pair of coupling rods.

Each seal plate has three segments, hinged together on the high pressure side of the plate, and an inflatable seal around the circumference of the plate to provide frictional seal between the plate and the nozzle walls. A flexible circular diaphragm covers the high pressure side of the plate. Each plate is held in its flat sealing condition by latch assemblies across the segments, on the low pressure side of the plate.

The inner seal plate has a slightly larger diameter than the outer seal plate, so that the inner seal plate is retained by its size within the frustoconical portion of the nozzle. The coupling assembly between the plates spaces them and provides for delivery of inflation fluid to the seals.

The center portion of the pressure side of the inner seal plate includes two parallel side walls interconnected at their ends by two arcuate end walls. A transverse web spanning the two side walls at the center of the section intersects a perpendicular longitudinal web which spans the arcuate end walls. Each side section of the inner seal plate has a pair of radially-extending webs along the inner surface.

Both seal plates have similar webs. The webs, by their nature cooperate with the plate to form a plurality of cavities or voids. The voids are filled with filler material such as closed cell EDPM rubber in order to provide a substantially planar top surface uniform backing support for the diaphragm.

Tabs, located only on the inner seal plate, attached to the low pressure surface of the center section, bear against the frustoconical portion of the inner surface of the nozzle to lodge the inner seal plate within the frustoconical portion, thus supporting the inner seal plate, and the outer seal plate by way of the coupling assembly, within the nozzle.

To mount the dam, in the vessel the operator unfolds and latches each seal plate to its flat sealing condition with diaphragms in place, then rotates the plates into proper alignment for the coupling assembly and joins them together parallel to each other. The coupling assembly consists of a quick-disconnect center coupler for seal pressure, and two support rods on each side of the center coupler, hinged to the inner seal plate, which are folded down for joining to the outer seal plate.

The operator then grasps the fully assembled, two plate, nozzle dam and inserts it into the nozzle, outer seal plate first. The insertion is continued until all the support tabs on the inner seal plate fully engage the frustoconical inner surface of the nozzle, whereby the nozzle seal is accurately disposed in its sealing position with the flat seal plates substantially perpendicular to the axis of the nozzle.

The inflatable seal on the outer seal plate is inflated first to prevent creep of the inner seal plate inflatable seal when it is inflated against the frustoconical portion of the nozzle.

SUMMARY OF THE INVENTION

There is a need for a nozzle dam that can be assembled by an operator in a confined space and installed, within only a few minutes. A nozzle dam is critical to plant safety and therefore must seal well and be strong.

Accordingly, it is one object of the invention is to provide a single-plate nozzle dam that is light in weight.

Another object is to provide a nozzle dam with independent sections wherein the segments need not be latched to one another during assembly.

It is another object to provide a nozzle dam that is constructed from only a few elements, having a plate machined from a single blank, and that is easy to decontaminate.

It is another object to have the plate contoured for strength with reduced mass, and provided with beams to resist segment twist.

Another object of the invention is to provide a nozzle dam with pressurized seals, and one that seals in four stages.

Another object is to provide a nozzle dam that resists leakage of fluid through it from two directions.

Still another object of the invention is to provide the nozzle dam with attachment bolts that may be quickly installed with minimum risk of binding or breaking, and that can be easily extricated if they break.

Other objects and advantages will become apparent from the ensuing description.

In accordance with the invention there is provided a nozzle dam for sealing a nozzle against a first fluid. The nozzle dam comprises a disk which includes first, second and third portions which include first, second and third diameters respectively, generated on a first axis, and an annular radial flange between the first and second diameters.

The first diameter is greater in size than the inner diameter of a ring which is at the opening of the nozzle. The ring is generally concentric with the nozzle walls. The disk further includes an annular, radial flange between the first and second diameters.

The second diameter of the disk is smaller in size than the inner diameter of the ring so that an annulus for sealing means is formed between the ring and disk when the disk is located with the flange on the ring with the second diameter concentric with the inner diameter of the ring.

The disk further includes a circular portion that is concentric with the first axis, and thinner, measured in solid cross section, than the central portion of the disk at the first axis, measured in solid cross section. The circular portion is contoured for resistance to stress from pressure of fluid against the disk, and for reduced disk mass within the third diameter. The thinner circular portion is smaller in diameter than the second diameter, and the contour comprises a concave annular outer surface of the disk, rising toward the center of the disk.

The flange includes openings for threaded fastening means, aligned with tapped openings in the ring for fastening the disk to the ring.

The sealing means includes two expandable hollow rings which are generally concentric with the second diameter. The sealing means also includes an annular flexible flange that is concentric with the second diameter, the flange being C shaped in cross section so that it presents two arms and a back. One arm of the C is sealingly disposed on the disk, and the other arm bears on the wall of the nozzle, with the back of the C directed toward the inner diameter of the ring when the disk is located on the ring.

The C flange forms a primary seal, with the two arms and back forming an open annulus in communication with the first fluid for expanding the C seal against the inner wall of the opening by dint of the fluid pressure.

The hollow rings are expandable by a second fluid means.

The disk is comprised of a plurality of segments, joinable within a radial plane at complementary abutting edges to make the disk. The edges include overlapping portions for retaining adjacent segments to the ring. At least one segment includes a beam oriented longitudinally with the segment, traversing and clearing the concave annular surface, and attached at each end to the segment, for resisting flexion of the segment and change in the length of the segment from stress of fluid pressure against the disk.

Flexible sealing means is attached to one segment, for sealing the seams of joining with another segment when they are joined, to resist flow of the first fluid through the disk.

The fastening means comprises a plurality of threaded bolt means. The threaded bolt means includes a shaft, threaded at the front end for screwing into the ring, and having a flat surface behind the thread for receiving wrench means. At the back end, the shaft is threaded on the outside and tapped at the central axis with a different pitch. The outside thread is for receiving a thumb knob, and the tap is for receiving a security screw to prevent inadvertent unscrewing of the thumb knob. A collar on the shaft centers the flange openings on the shaft,

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
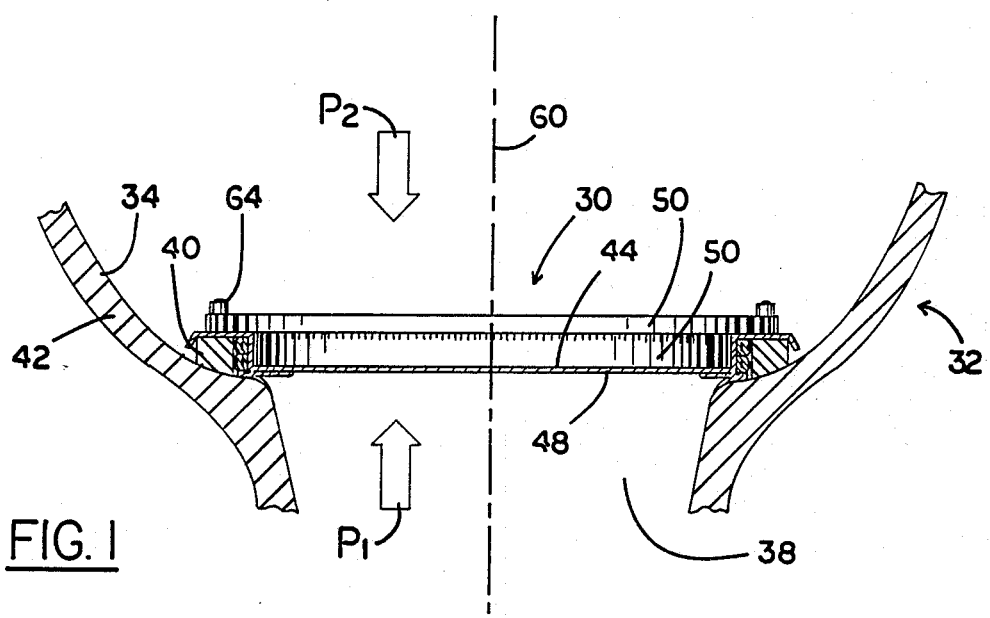
FIG. 1 is a cross section view of a nozzle with a nozzle dam constructed according to a preferred embodiment of the invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to the drawings, nozzle dam 30, as shown in FIG. 1, is mounted in a nuclear steam generator, a portion of which is shown 32, for sealing between the vessel 34, and a frustoconical nozzle 38 of the vessel.

Dam 30 may be subjected to fluid pressure Pl from the nozzle side of an inlet nozzle when the reactor water level (not shown) is temporarily reduced to below the level of vessel 34. Nozzle dam 30 is installed to protect vessel maintenance personnel from unexpected backflow of reactor water into the vessel via the inlet nozzle.

Dam 30 may also be subjected to fluid pressure P2 from the vessel side when it is used to seal an outlet nozzle during certain maintenance operations.

Although the nozzle dam may be used for either purpose, it is shown in side view in FIG. 1, configured for resisting a fluid pressure Pl, that is, one from the nozzle side.

Ring 40 shown in cross section is sealingly attached by welding 46 (FIG. 5) or other practical method to wall 42 of the nozzle.

Flat bottom surface 44 of nozzle dam 30 is covered by a flexible, water resistant sheet 48 that extends beyond the diameter of ring 40. Disk 50 of the dam is segmented, as described later, and sheet 48 prevents leakage through the seams of joining 52 (FIG. 2).

Figure 2:
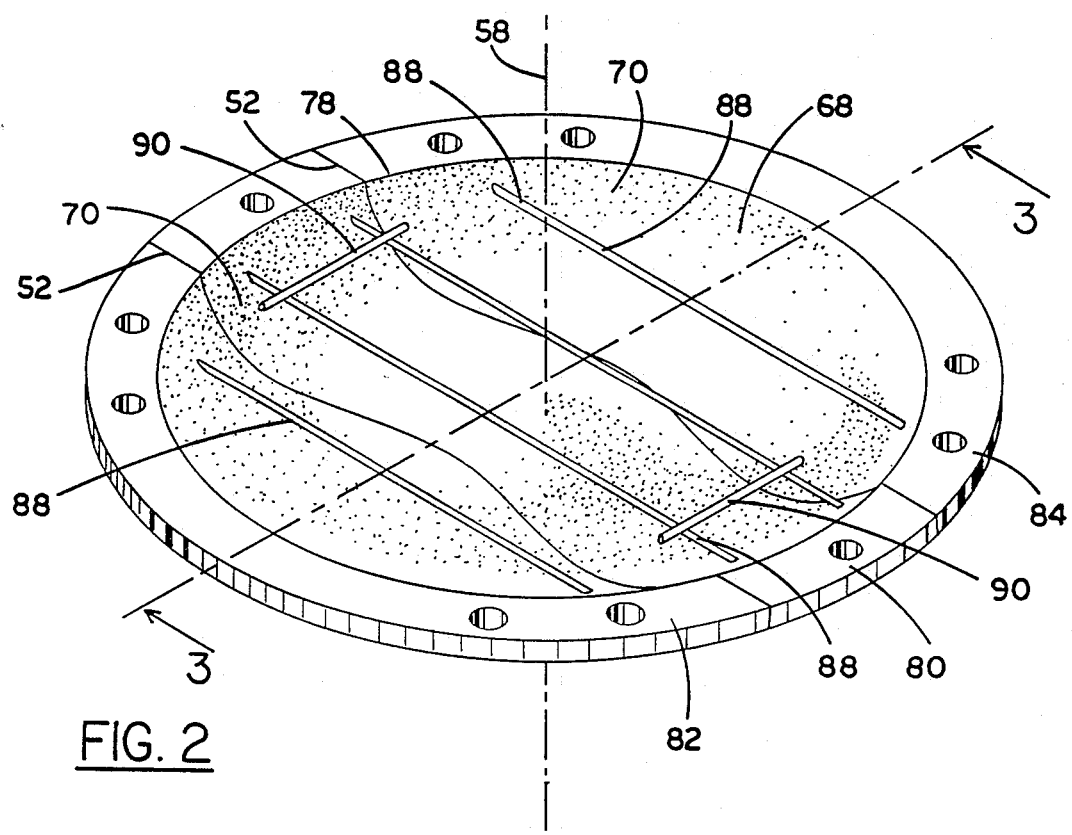
FIG. 2 is a top plan view of a nozzle dam constructed according to one embodiment of the invention.
Figure 5:
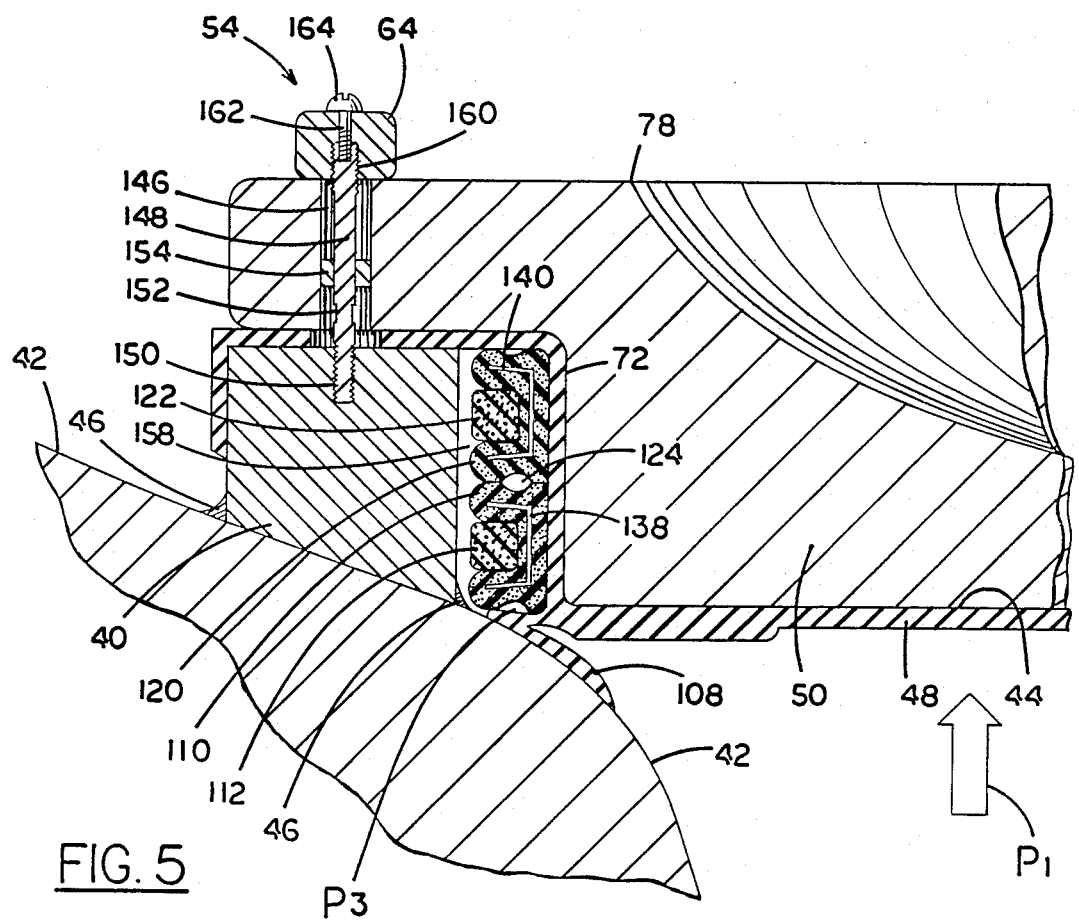
FIG. 5 is a cross section view of an attachment of the nozzle dam to a nozzle.

Referring to FIGS. 1, 2, and 5, dam 30 is bolted to ring 40 by fastener assembly 54, which holds central axis 58 generally concentric with central axis 60 of nozzle 38. Fastener assembly 54 is designed to permit secure mounting of disk 50 without breaking of bolt shaft 148, and to permit reversible fastening of the disk to the ring by threaded hand knobs 64.

Figure 3:
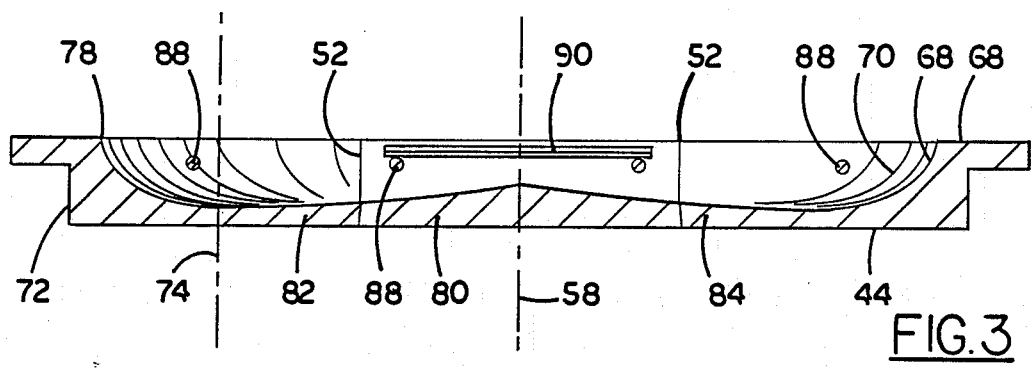
FIG. 3 is a cross section view of the nozzle dam shown in FIG. 2 taken along the lines 3—3.
Figure 4:
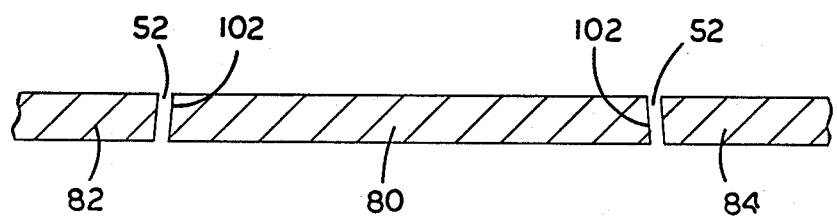
FIG. 4 is a cross section view of the seams of joining of segments of the nozzle dam.

Referring to FIGS. 2, 3 and 4, upper surface 68 of disk 50 is machined with a contour 70 that is designed generally to follow the bending moment curve so as to minimize stresses from fluid pressure, with a disk of minimum weight. For example, in one design, the disk is machined with a contour 70 that is designed so that the square of the thickness generally follows the bending moment curve over most of the contour.

In one design of a 41.5" diameter disk, being 37" diameter to shoulder 72, the disk is only 0.375" thick at the 11.5" diameter thinner circular portion 74 that is concentric with central axis 58 of the disk, while the central portion of the disk at axis 58 is 1.5" thick. This contouring reduces disk mass within diameter 78 considerably.

Disk 50 is separable into three segments 80, 82 and 84. Beams 88 prevent rotation of the segments to which they are attached.

They resist flexion of the segment and change in the length of the segment from stress of fluid pressure against the disk. Attachment is preferably fixed in the longitudinal direction at each end of the beam, and it may also be fixed rotationally as well. Beams 88 provide mounting locations for grasping bars 90. Grasping bars 90 are provided for convenient operator manipulation of the nozzle dam, and are not necessarily required for disk strengthening.

Chamfer 102 of 5 degrees on each side of segment 80 matches complementary chamfers on segments 82 and 84. In the assembled and mounted nozzle dam, the chamfers of segments 82 and 84 overlap segment 80, providing backup retention to the fastener assembly at each end of segment 80. Alternatively, the complementary edges are formed in a double V or other interlocking configuration.

Figure 6:
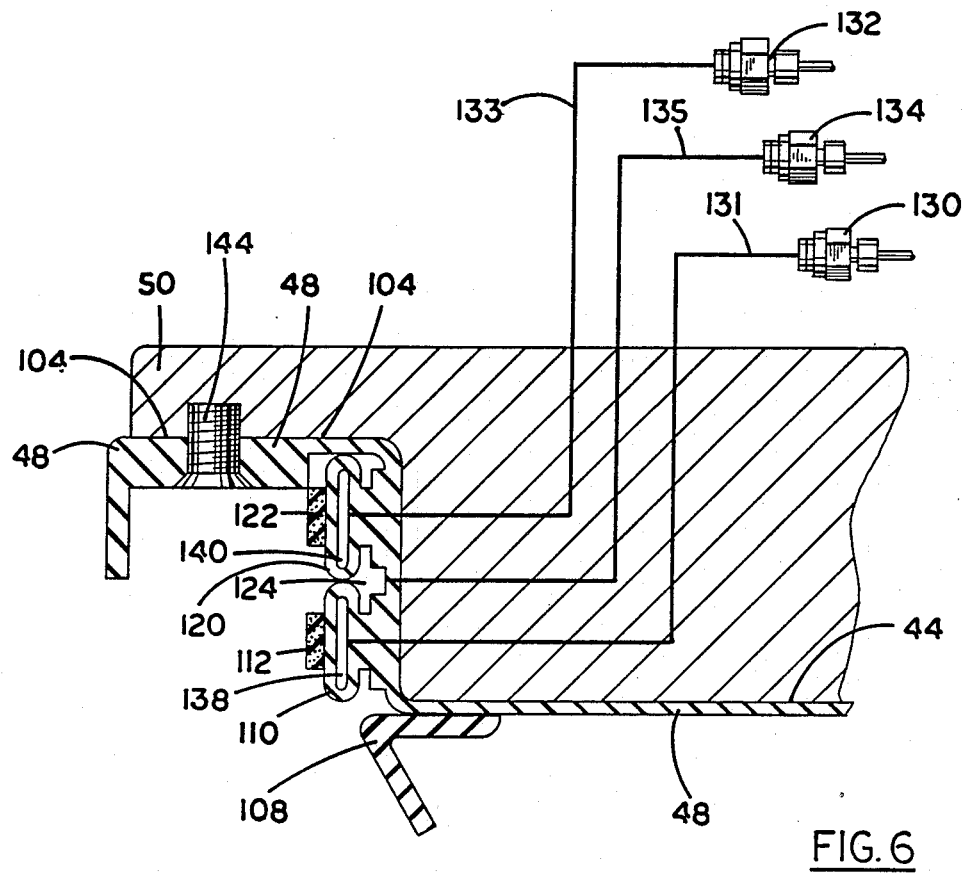
FIG. 6 is a schematic view of a sealing means constructed according to the invention.

Referring to FIGS. 5 and 6, water resistant sheet 48 establishes a seal between flange surface 104 of disk 50 and ring 40, when the disk is bolted to the ring, but this is a fourth stage precautionary seal.

The first stage seal against leakage past the nozzle dam is provided by C shaped flexible annular flange 108 which is sealingly attached to sheet 48. Flange 108 is hydraulically pressed against wall 42 by the differential in pressure between P1 and P3 static pressure behind the seal.

The second stage seal is provided by annular expandable sealing ring 110, shown deflated. Sealing ring 110 is inflatable by a pressurized control fluid source 130 under pressure, delivered through line 131. When inflated the sealing ring expands simultaneously into water tight contact with disk 50 and by way of captured rubber ring 112, with ring 40. Ring 112 provides superior lateral grip and seal against surface and dimensional irregularities in ring 40 than can ring 110 which is limited to a flexible material for inflation into the expanded profile. The material need not be stretchable. For example it may only unfold into the expanded profile.

The third stage seal is provided by expandable sealing ring 120 and rubber ring 122 in a similar manner to that of the second stage seal. It is inflated by a pressurized control fluid source 132, through line 133. Annular interseal space 124 is brought under low pressure by a pressurized sensing fluid source 134, through line 135.

Referring to FIG. 6, second and third stage sealing rings 110 and 120 have slightly different cross sectional profiles than those shown in FIG. 5 although their manner of operation is the same Control fluid from source 130 fills hollow space 138 to expand ring 110. Control fluid from source 132 fills hollow space 140 to expand ring 120. Sensor fluid from source 134 pressurizes space 124. The pressure in source 134 line is monitored for change which could warn of leakage of Pl fluid past flange 108 seal and ring 110 seal.

Water resistant sheet 48 is preferably attached to the bottom of segment 80 for convenience of transportation when the nozzle dam is carried disassembled into the pressure vessel When the nozzle dam is assembled, sheet 48 is attached to flange surface 104 by screw 144 in four places around the disk to temporarily hold the sheet in place while the dam is fastened to the nozzle. Screw 144 is driven sufficiently into the sheet so that it does not interfere with compression of the sheet between ring 40 and flange surface 104. Resistance to passage of water through seams of joining 52 from direction P2 is provided one way, by close fit of the segments and by rubber lips or ribs (not shown) bonded to the tops of the segments along the mating edges for sealing by overlap of an adjacent edge or by contact between the lips or ribs.

Threaded rear end 160 of shaft 148 of fastener assembly 54 shown in FIG. 5 receives hand knob 64 which is screwed down on shaft 148 in order to fasten disk 50 on ring 40. Rear end tap 162 of shaft 148 receives security screw 164 which prevents accidental unscrewing of knob 64.

Shaft 148 has threaded front end 150 for screwing into ring 40 by way of knob 64. It is screwed into the ring once it is passed down to the ring through opening 146. It is screwed out by reversing the operation. Spacer 154 contributes to alignment of shoulder 72 with respect to ring 40 so that annulus 158 formed between them for the expandable sealing rings is uniform in width about shoulder 72.

Should threaded end 150 bind, screw 164 and knob 64 are removed, disk 50 is lifted off ring 40, and the shaft is backed out with a wrench on flats 152. Wrench flats 152 permit removal of the bound threads without breaking the shaft, by torquing close to the ring. Tap 162, rear end 160, and front end 150 threads are of different pitch for added security.

Although attachment of the contoured disk with beams is described as being to ring 40, with expandable sealing rings 110 and 120 bearing against ring 40, the disk with beams and sealing rings may also be installed in the nozzle, and retained by any suitable fastening means. In this embodiment of the invention rings 110 and 120 are expanded to bear against the parallel or conical nozzle walls.

In order to install nozzle dam 30 from inside the pressure vessel according to a preferred procedure, the operator lays segment 80 on ring 40, with the aid of guide tabs (not shown) on the periphery of the segment, and spreads water resistant sheet 48 which is attached by screws 144 to the underside of segment 80, over the ring. Temporarily positioning segments 82 and 84 over segment 80, the operator then places them on the ring in abutting relationship to segment 80. Fastener assemblies 54 are then passed through openings 146 around the assembled disk and screwed into the ring by means of hand knobs 64. The three pressurized fluid sources are connected and activated, and installation is complete.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A nozzle dam for sealing a nozzle against flow of a first fluid through the nozzle, said nozzle having an inner wall forming a frustoconical opening, and a ring mounted by a bottom end about said opening, said ring being adapted for receiving fastening means around the top of said ring, the inner diameter of said ring being for receiving sealing means; said nozzle dam comprising:

a disk including a top and a bottom, said disk further comprising a first portion having a first diameter near the top, a second portion having a second diameter, and a third portion having a third diameter, said first, second and third diameters being generated on a first axis, said disk further including an annular, radial flange between said first and second diameters, the first diameter of said disk being greater in size than the inner diameter of said ring, the second diameter of said disk being less in size than the inner diameter of said ring so that an annulus for sealing means is formed between the ring and the disk, when the disk is located on the ring with the second diameter concentric with the inner diameter of the ring, said third diameter portion comprising a circular portion that is concentric with said first axis and thinner, measured in solid cross section, than the central portion of said disk at said first axis measured in solid cross section, said circular portion being contoured for resistance to stress from pressure of said first fluid against the disk, and for reduced disk mass within said third diameter, said flange including openings for threaded fasteners, said openings being so located on the flanges that they may be aligned with tapped openings in the top end of said ring, for fastening said disk to said ring, said nozzle dam further comprising sealing means expandable by a second fluid under pressure, said sealing means being located on the second diameter portion for sealing between the disk and the ring by expanding within the annulus, and means for delivering said second pressurized fluid to the sealing means.

2. The nozzle dam described in claim 1, further comprising:

said contour comprising a concave annular outer surface of the disk, rising toward the center of the disk.

3. The nozzle dam described in claim 2, further comprising:

said disk comprising a plurality of segments, joinable within a radial plane to make said disk, said nozzle dam further comprising a beam, said beam being oriented longitudinally with a segment, traversing and clearing the concave annular surface, and attached at each end to the segment, for resisting flexion of the segment and change in the length of the segment from stress of fluid pressure against the disk.

4. The nozzle dam described in claim 3, further comprising:

said plurality of segments having complementary edges for assembly into said disk by abutment, said edges including overlapping portions for retaining adjacent segments to the ring.

5. The nozzle dam described in claim 3, further comprising:

said concave annular surface being at the top of the disk.

6. The nozzle dam described in claim 1, further comprising:

said expandable sealing means comprising;

a first hollow flexible ring, and a second hollow flexible ring adjacent to said first hollow ring, both hollow rings being generally concentric with said second diameter, and said nozzle dam further comprising;

an annular, flexible flange that is concentric with said second diameter, said flange being generally C shaped so that it presents two arms and a back, one arm of the C being so sealingly disposed on said disk that the second arm bears on the inner wall of the opening, with the back of the flange directed toward the inner diameter of the ring when the disk is located on the ring, said two arms and back forming an open annulus in communication with said first fluid for expanding the C seal against the inner wall of the opening by pressure of the first fluid, said first and second hollow rings being expandable by said second fluid means for sealing against the inner diameter of the ring.

7. The nozzle dam described in claim 3, further comprising:

said expandable sealing means comprising;

a first hollow flexible ring, and a second hollow flexible ring adjacent to said first hollow ring, both hollow rings being generally concentric with said second diameter, and said nozzle dam further comprising;
an annular, flexible flange that is concentric with said second diameter, said flange being generally C shaped so that it presents two arms and a back, one arm of the C being so sealingly disposed on said disk that the second arm bears on the inner wall of the opening, with the back of the flange directed toward the inner diameter of the ring when the disk is located on the ring,
said two arms and back forming an open annulus in communication with said first fluid for expanding the C seal against the inner wall of the opening by pressure of the first fluid,
said first and second hollow rings being expandable by said second fluid means for sealing against the inner diameter of the ring.

8. The nozzle dam described in claim 3, further comprising:
flexible sealing means, attached to one segment, for sealing the seams of joining with another segment upon said forming, for resistance against flow of said first fluid through said disk.

9. The nozzle dam described in claim 7, further comprising:
flexible sealing means, attached to one segment, for sealing the seams of joining with another segment to which the sealing means is not attached before said joining, for resistance against flow of said first fluid through said disk.

10. The nozzle dam described in claim 1, further comprising:
said fastening means comprising a plurality of threaded bolt means through said flange openings, said threaded bolt means comprising:
a shaft having a front end and a back end,
the back end of the shaft being tapped at the central axis for receiving a screw, and tapped on the circumference for receiving a threaded knob, the two threads being of different pitch,
the front end of the shaft being threaded for screwing the shaft into the top of the ring, and a flat surface behind the thread for receiving wrench means for reversibly screwing the shaft into the ring,
said threaded knob being for fastening said plate flange to said ring.

11. The nozzle dam described in claim 10, further comprising:
a collar on the shaft, behind the flat surface, and said opening in the flange for the threaded fastener being large enough for receiving the collar, for aligning said second diameter with respect to the inner diameter of said ring.

12. A nozzle dam for sealing a nozzle against flow of a first fluid through the nozzle, said nozzle having an inner wall forming the nozzle opening about a first axis; said nozzle dam comprising:
a disk including a top and a bottom, and a portion having an outer diameter that forms an annulus with said wall when the disk is located coaxially in the nozzle, said annulus being for sealing means, and means for fastening the disk coaxially in the nozzle for maintaining said annulus,
said disk comprising a circular portion that is concentric with said first axis and thinner, measured in solid cross section, than the central portion of said disk at said first axis measured in solid cross section, said circular portion being contoured for resistance to stress from pressure of said first fluid against the disk, and for reduced disk mass,
said nozzle dam further comprising sealing means expandable by a second fluid under pressure, said sealing means being located on the outer diameter portion of the disk for sealing between the disk and the wall by expanding within the annulus, and
means for delivering said second pressurized fluid to the sealing means,
said contour comprising a concave annular outer surface of the disk, rising toward the center of the disk,
said disk comprising a plurality of segments, joinable within a radial plane to make said disk.

13. The nozzle dam described in claim 12, further comprising:
said nozzle dam further comprising a beam, said beam being oriented longitudinally with a segment, traversing and clearing the concave annular surface, and attached at each end to the segment, for resisting flexion of the segment and change in the length of the segment from stress of fluid pressure against the disk.

* * * * *